United States Patent

[11] 3,595,000

| [72] | Inventor | Kenneth H. Recker |
| | | Winter Haven, Fla. |
| [21] | Appl. No. | 54,905 |
| [22] | Filed | July 15, 1970 |
| [45] | Patented | July 27, 1971 |
| [73] | Assignee | Heli-Pic, Inc. |
| | | Haines City, Fla. |
| | | Continuation-in-part of application Ser. No. 717,871, Apr. 1, 1968, now abandoned. |

[54] MACHINE AND METHOD FOR GATHERING FRUIT AND THE LIKE FROM THE GROUND
8 Claims, 5 Drawing Figs.

[52] U.S. Cl. .................................................. 56/328, 214/356
[51] Int. Cl. .................................................. A01d 51/00
[50] Field of Search ........................................ 56/328, 329, 27; 214/351, 352, 353, 356

[56] References Cited
UNITED STATES PATENTS

| 1,907,467 | 5/1933 | Terro et al. ................. | 56/328 |
| 2,065,169 | 12/1936 | Carpenter ................... | 56/328 |
| 2,230,139 | 1/1941 | Gustin ........................ | 56/328 UX |
| 2,441,244 | 5/1948 | Kimball ...................... | 56/328 |
| 2,484,437 | 10/1949 | Wells .......................... | 214/356 |
| 2,515,966 | 7/1950 | Polisena ...................... | 56/328 X |
| 2,643,754 | 6/1953 | Doak ........................... | 56/328 X |
| 2,679,133 | 5/1954 | Soderholm .................. | 56/328 |
| 3,200,572 | 8/1965 | Sweet .......................... | 56/328 X |
| 3,362,551 | 1/1968 | Shoemaker .................. | 214/356 |

Primary Examiner—Russell R. Kinsey
Attorney—Watts, Hoffman, Fisher & Heinke

ABSTRACT: A fruit-gathering vehicle adapted to move over ground onto which fruit has fallen and includes a plurality of parallel runners each pivotally supported at their forward ends on a frame and curving downwardly to intermediate portions adapted to ride longitudinally on the ground, the runners each comprise a pair of parallel rods formed so that the forward portions are spaced apart to receive an individual fruit therebetween and the intermediate portions lie closer to one another so that they move between the ground and the opposite undersides of the fruit positioned by the forward positions of the rods. Fruits are aligned with the runners by discs engaging the ground between adjacent runners forwardly of the runners and which rotate opposite to the direction of movement of the vehicle. The rearward portion of the rods curve upwardly and guide the fruit onto a receptacle. The fruit is propelled rearwardly along the rods by endless moving elements which float and engage the top portions of fruit.

PATENTED JUL 27 1971

INVENTOR
KENNETH H. RECKER
BY
*Watts, Hoffmann, Fisher & Heinke*
ATTORNEYS

PATENTED JUL 27 1971 3,595,000

INVENTOR
KENNETH H. RECKER
BY
Watts, Hoffmann, Fisher & Heinke
ATTORNEYS 3,595,000

MACHINE AND METHOD FOR GATHERING FRUIT AND THE LIKE FROM THE GROUND

This application is a continuation-in-part of Ser. No. 717871, filed Apr. 1, 1968 and now abandoned.

THE INVENTION

The present invention relates to a fruit-gathering machine, or the like, particularly suitable for gathering spherical fruit, such as citrus fruit, from the ground.

The principal object of the present invention is the provision of a machine which may be self-propelled over ground on which spherical fruit or the like has fallen and which quickly and efficiently gathers the fruit from the ground with little or no damage to the fruit.

In carrying out the invention a frame is provided which may be moved over the ground and which supports a plurality of elongated generally parallel and closely spaced runners which are moved longitudinally along the ground and adapted to move beneath opposite undersides of an individual fruit lying on the ground, means being carried forwardly of the forward ends of the runners engage and position fruit lying on the ground in alignment with the runners the intermediate runners being spaced together whereby the runners inserted beneath an individual fruit supports and guides the fruit rearwardly therealong, means at the rear of the runners for receiving fruit therefrom and endless elements for propelling the fruit along the runners and into the receptacle. Preferably the runners are supported individually on the frame so that they may shift vertically and closely follow uneven areas of the ground over which they move, and the endless fruit moving elements are preferably supported above the respective runners so as to move towards and from the runners and the ground for maintaining engagement with the top portions of fruit of varying diameters.

Other objects and advantages of the invention will become apparent from a consideration of the following detailed description thereof made with reference to the accompanying drawings which form a part of the specification and wherein.

Figure 1:
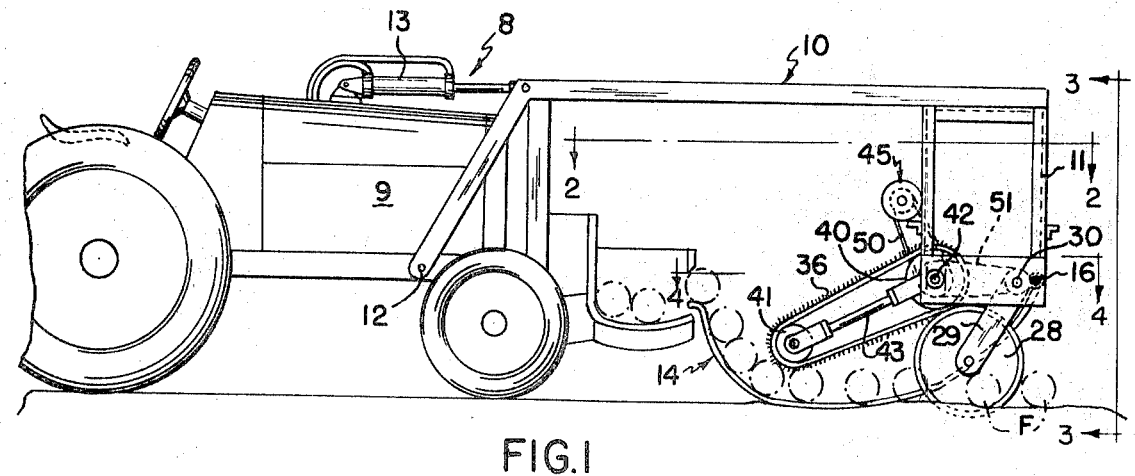
FIG. 1 is a side elevational view of a fruit-gathering machine embodying the invention.
Figure 2:
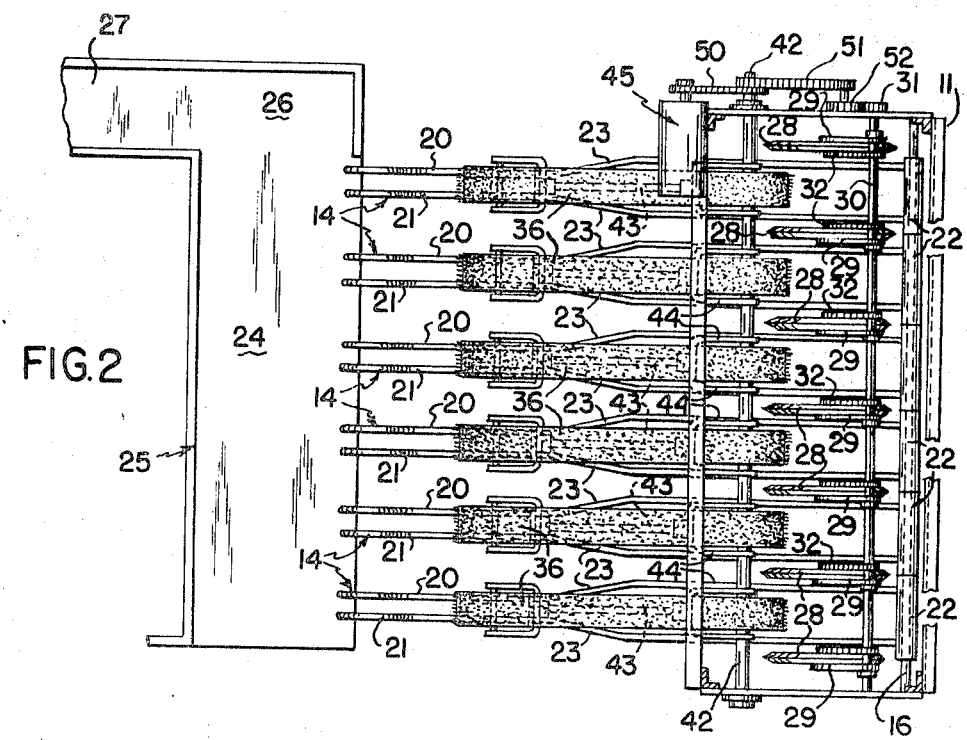
FIG. 2 is a sectional view taken substantially along line 2-2 of FIG. 1 and on a larger scale.
Figure 4:
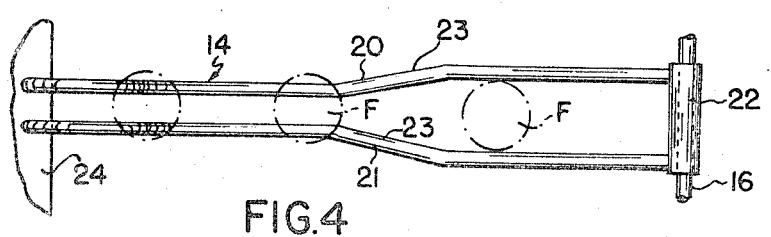
FIG. 4 is a fragmentary elevational plan view of a runner taken substantially along line 4-4 of FIG. 1.
Figure 3:
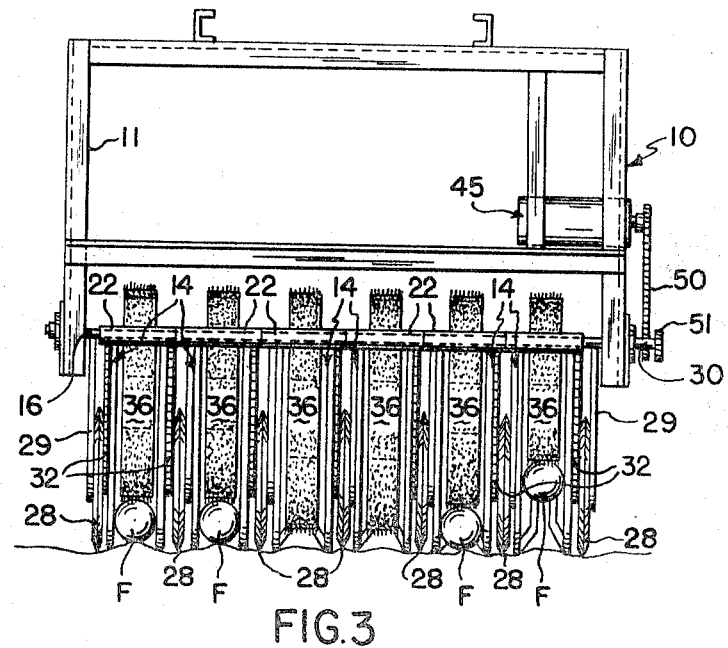
FIG. 3 is a front elevational view of the machine taken along line 3-3 of FIG. 1.

Referring to the drawings, the invention is shown embodied in a citrus fruit gathering machine 8 adapted to be driven over the ground on which fruit F is lying and for gathering the fruit into suitable containers. The machine comprises a self-propelled vehicle 9 of any suitable construction by which a driver may readily control its movements along the ground. The fruit-gathering section of the machine is supported on a framework 10 extending cantilever fashion forwardly of the vehicle 9. The framework 10 includes a frame section 11 which extends transversely of the direction in which the vehicle 9 is designed to travel. The frame 10 is pivoted at 12 to the vehicle 9 and is adapted to be raised and lowered relative to the ground by suitable means, such as a hydraulic motor 13.

A plurality of runners 14 are suspended from the frame section 11, the runners being pivoted at their forward ends above the ground level on a shaft 16 supported on the frame. In the form shown, the runners 14 are each comprised of a pair of symmetrically formed rods 20, 21 which extend parallel with one another and the forward ends of the rods are attached to bushings 22 which are journaled on the shaft 16. Thus, each pair of rods 20, 21 or each runner 14 is individually pivoted to the shaft 16 and the intermediate sections lie on the ground when the frame 10 is in its lowered position. The forward sections of the rods 20, 21 are curved downwardly and rearwardly from the bushings 22 and form sloping leading edges for the intermediate sections of the rods which rest on the ground when the machine is operative. The curved sections enable the runners 14 to glide along uneven portions of the ground and the pivot means 16, 22 permits each runner to shift vertically relative to the frame and thereby follow in engagement with uneven contours of the ground surface.

The forward portions of each pair of rods 20, 21 which slope downwardly to the sections of the rods which engage the ground are spaced relatively widely apart, that is to say, slightly further apart than the likely maximum diameters of the fruit to be gathered so that these portions of the rods straddle the individual fruits. The forward sections of the rods engaging the ground and adjacent the downwardly curved portions are bent inwardly towards one another as at 23 so that the sections of the rods riding on the ground are spaced apart somewhat less than the diameters of the fruit to be gathered and form tracks on which the fruit is supported and guided rearwardly, as is explained more fully hereinafter.

The rear sections of the runners 14 are curved upwardly and their ends are reversed so as to extend over the forward edge of a floor 24 of a tilted trough 25 which catches fruit emerging from the runners and causes the fruit to roll to one end 26 and out a conveyor chute 27 to a suitable elevator leading to a container on the vehicle. The elevator and container are not shown as they are unnecessary to the understanding of the present invention.

The forward ends of each pair of rods 20, 21 forming the runners 14 are closely spaced to the adjacent runners so that the fruit will be funnelled between the two rods of one or the other of the runners as the machine 10 advances along the ground. To assist in guiding fruit into the runners 14, separators in the form of discs 28 are journaled to the lower ends of arms 29 pivotally supported on a shaft 30 attached to the frame member 11 so that the discs lead the runners. One disc 28 is located between each forward end of the runners 14 to insure that fruit which might otherwise lodge between adjacent runners will be moved laterally into alignment with the forward end of one runner or another. The discs 28 are supported on the pivoted arms 29 so as to follow any unevenness in the ground surface.

Figure 5:
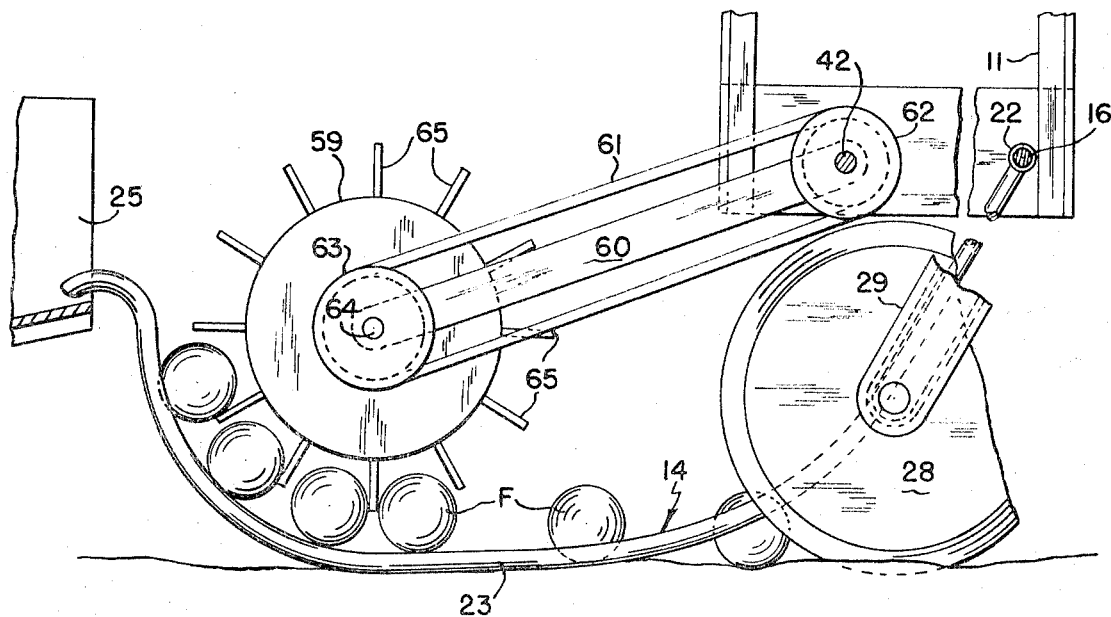
FIG. 5 is a fragmentary side elevational view of another form of the invention.

The discs 28 are driven in a counterclockwise direction, as viewed in FIGS. 1 and 5, so that as the vehicle 9 moves to the right the rotation of the discs will be counter to the direction of movement of the vehicle. The discs thus tend to push any fruit in their paths to one side or the other and into alignment with the spaced rods 20, 21 of the adjacent tracks 14. Preferably, the discs 28 are beveled so as to cause the fruit to be more readily deflected. In the form shown, the shaft 30 is driven by a gear 31 as described hereinafter and sprockets on the shaft drives chains 32 which are attached to sprockets on the respective disc hubs. The arms 29 have bearings which pivotally support the arms to the rotating shaft 30 so that the shaft rotates relative to the arms. The weight of the discs 28 on the arms 29 together with the counterclockwise movement of the shaft 30, as viewed in FIG. 1, urge the discs 28 against the ground.

The fruit entering between the relatively widely separated portions of the pairs of rods 20, 21 are thereby aligned with the relatively closely spaced sections of the rods and the forward motion of the machine causes the inwardly curved sections 23 to be inserted beneath the fruit to elevate it onto the rods. These fruits tend to roll rearwardly on the rods 20, 21 and are engaged by endless belts 36, one of which is supported over and extends generally parallel with each of the runners 14, and which belts propel the fruit rearwardly and up curved sections of the runners and into the trough 25. The ends of each of the belts 36 encircle two pulleys 40 and 41, the pulley 40 being attached to a shaft 42 journaled on the frame section 11 and the pulley 41 being journaled on the rearward end of an arm 43. The forward end of the arm 43 has a yoke 44, the legs of which are pivotally supported on the shaft 42, and the rearward end of the arm may shift in a vertical plane. An arm 43 is positioned above each runner 14.

The shaft 42 is driven clockwise, as viewed in FIG. 1, by a suitable power source 45, such as a hydraulic motor, and drives the pulleys 40 in a direction to cause the lower reaches of the belts 36 to move rearwardly relative to the runners 14 and roll the fruit along the runners and into the trough.

The arms 43 may shift about the shaft 42 so that the rearward ends of the arms carry the pulleys 41 in a vertical plane about the shaft 42 and shift the belts 36 towards or away from the respective runners 14 to accommodate fruit of varying diameters without unduly compressing the fruit. The rods 20, 21 are somewhat resilient and the upwardly curved sections leading to the trough 25 may yield rearwardly to accommodate larger fruit moving between the rods and the belt. Although not shown, counterbalancing springs could be provided to reduce the weight of the belts 36 and their support structure on the fruit and stop means could be provided to prevent the belts from engaging the runners in the absence of any fruit on the runners.

Preferably, the outer surfaces of the belts 36 have a multiplicity of soft protrusions for engaging and positively moving the fruit along the runners 14 with a minimum of pressure being exerted on the fruit. Fruit moving upwardly on the rearmost sections of the runners 14 leaves the belts 36 and is forced upwardly into the trough 25 by the fruit being propelled by the belts. If desired, suitable side bars could be positioned alongside the rearward sections of the runners to prevent the fruit from rolling down the sides of the runners. For sake of clarity, such side bars are not shown.

The hydraulic motor 45 drives the shaft 42 in a clockwise direction, as viewed in FIG. 1, through a drive chain 50. The shaft 42 has a drive sprocket attached thereto to receive the drive chain 50, and a second sprocket is attached to the shaft which drives a chain 51 connected with a sprocket having a gear 52 attached thereto. The gear 52 is pivoted to the frame 11 and meshes with the gear 31 so as to drive the shaft 30 in a direction opposite to the direction the shaft 42 is driven.

A second form of the invention is illustrated in FIG. 5 in which the belts 36 have been replaced by drums 59, only one of which is shown. In the form shown, the fruit supported on each of the runners 20, 21 is moved or propelled upwardly to the trough 25 by rotating a drum 59, only one of which is shown, which is supported on the rearward end of arms 60, only one of which is shown, and is rotated by a belt 61 attached to pulleys 62, 63. The pulley 62 is attached to the shaft 42 and the pulley 63 is attached to the axle 64 for the drum 59, which axle is supported by the arm 60. The drum 59 has a plurality of pads 65, which may be formed of flexible sheetlike members which extend radially from the drum and yieldingly engage fruit on the upwardly curved portion of the adjacent runner 14 and move it along the runner into the trough 25, as illustrated. Each drum 59 is somewhat wider than the portion of the runner 14 which it overlies.

In the second form of the invention the drums 59 are free to move in a vertical plane relative to the runners by reason of the pivotal connection of the arms 60 with the shaft 42. Thus, fruits of different sizes on the runners are assured of engagement by the members 65 of the rotating drums 59. Although not shown, means, such as counterbalancing springs, may be provided to limit the weight of the drums 60 on the fruit engaged thereby and to prevent the drums from engaging the runners 14 therebeneath.

It will be seen that by my invention a fruit-gathering machine is provided which is relatively simple and inexpensive to construct and operate, yet is effective to gather fruit with little or no damage to the fruit.

Although but two forms of the invention have been shown, it is apparent that other forms, modifications and adaptations can be made, all falling within the scope of the claims which follow.

I claim:
1. A machine for gathering fruit or the like from the ground comprising a frame adapted to be moved forwardly over the ground, a pair of elongated members attached to said frame and forming spaced fruit-supporting surfaces adapted to extend substantially parallel to one another and to be moved longitudinally along the ground by movement of said frame, means pivotally attaching the forward ends of said members to said frame at an elevation above the fruit to be gathered, the forward portions of said members being curved downwardly from said frame and rearwardly, said portions spaced apart to receive a single fruit therebetween, the sections of said members rearwardly of said curved portions adapted to rest on the ground and being spaced apart to form a tracklike guide extending rearwardly and adapted to support a fruit resting on said sections, the trailing ends of said members being free to shift in a vertical plane whereby said members may shift in elevation relative to said frame, a fruit receiving means positioned rearwardly of said fruit-supporting surfaces in a position to receive fruit moving from said surfaces, and means supported on said frame above said sections of said members for propelling fruit rearwardly along said spaced surfaces, the last-mentioned means comprising an arm pivoted to said frame and extending rearwardly, and a moving fruit-engaging element on the rearward portion of said arm and above said fruit-supporting sections of said members and adapted to engage the top of fruit on the sections therebeneath and move the fruit rearwardly, said arm being movable in a vertical plane about its pivot to vary its spacing from said sections according to variations in diameter of different fruits on said sections.

2. A fruit-gathering machine or the like as defined in claim 1 further characterized by a plurality of pairs of said members arranged side by side, and fruit-positioning means attached to said frame and disposed forwardly of said curved portions of said members and intermediate the planes of said curved portions of adjacent members of adjacent pairs of members, said positioning means comprising abutments for moving fruit laterally and between the planes of the curved portion of a pair of said members.

3. A fruit-gathering machine or the like as defined in claim 1 further characterized by the fruit-engaging element comprising a moving endless belt supported by spaced pulley wheels above said sections of said members.

4. A fruit-gathering machine or the like as defined in claim 2 further characterized by each of said abutments comprising a disc, and an arm pivotally attached to said frame for swinging in a vertical plane, said disc attached to the swinging end of the last-mentioned arm and supported in a vertical plane, said disc adapted to rotate relative to the ground.

5. A fruit-gathering machine or the like as defined in claim 4 further characterized by the fruit-engaging element comprising a moving endless belt supported by spaced pulley wheels above said sections of said members.

6. A fruit-gathering machine or the like as defined in claim 1 further characterized by a plurality of pairs of said members arranged side by side and one of said movable fruit-engaging elements being disposed above each pair of sections of said members, each of said elements being movable in a vertical plane independently of said sections.

7. A fruit-gathering machine or the like as defined in claim 2 further characterized by each of said abutments comprising a disclike member adapted to rotate about a horizontal axis and in a direction relative to the ground opposite to the direction of movement of the machine, and means to rotate said disclike members in said direction.

8. A fruit-gathering machine or the like as defined in claim 4 further characterized by means to rotate said discs in a direction relative to the ground opposite to the direction of movement of the machine.